United States Patent

Van Zyl et al.

[11] Patent Number: 5,518,975
[45] Date of Patent: May 21, 1996

[54] SOLID ELECTROLYTE CERAMIC

[75] Inventors: Arnold Van Zyl; Sikha Ray, both of Ulm, Germany

[73] Assignee: Programme 3 Patent Holdings, Luxembourg, Luxembourg

[21] Appl. No.: 330,691

[22] Filed: Oct. 28, 1994

[30] Foreign Application Priority Data

Oct. 29, 1993 [ZA] South Africa ............... 93/8112

[51] Int. Cl.⁶ ..................................... C04B 35/10
[52] U.S. Cl. .................. 501/153; 501/120; 501/127; 423/600
[58] Field of Search ................... 501/120, 127, 501/153; 423/600

[56] References Cited

U.S. PATENT DOCUMENTS

| | | | |
|---|---|---|---|
| 4,496,664 | 8/1990 | Van Zyl et al. | 423/600 |
| 4,732,741 | 3/1988 | Duncan et al. | 423/119 |
| 5,162,273 | 11/1992 | Newkirk et al. | 501/127 |
| 5,326,519 | 7/1994 | Claussen | 501/103 |
| 5,358,914 | 10/1994 | Newkirk et al. | 501/127 |

FOREIGN PATENT DOCUMENTS

| | | |
|---|---|---|
| 0545438 | 6/1993 | European Pat. Off. . |
| 545438 | 6/1993 | European Pat. Off. . |

*Primary Examiner*—Melissa Bonner
*Attorney, Agent, or Firm*—Arnold, White & Durkee

[57] ABSTRACT

A method of making a β-alumina compound which is a polyaluminate of the general formula $M_yO \cdot xAl_2O_3$ in which M is a metal selected from monovalent metals and divalent metals, y=2 when M is a monovalent metal, y=1 when M is a divalent metal and x=4–12 comprises forming a green precursor of the 62-alumina compound by mixing together particulate aluminium metal and a reagent compound comprising an oxide of the metal M or a precursor thereof. The mixture is heated to 800°–1150° C. in an oxidizing environment to cause oxidation of at least part of the aluminium. Further heating then takes place to 1150°–1350° C. in said environment to cause the oxidized aluminium and oxide of the metal M to react to form the β-alumina compound.

21 Claims, No Drawings

SOLID ELECTROLYTE CERAMIC

THIS INVENTION relates to a method of making β-alumina compounds. More particularly, it relates to a method of making such compounds which is suitable for the manufacture of polycrystalline artefacts comprising β-alumina compounds. The invention also relates to such artifact when made in accordance with the method, and the invention relates to a green precursor admixture for use in making β-alumina compounds.

β-alumina compounds form a family of polyaluminates with the general formula:

$$M_yO \cdot x\, Al_2O_3$$

in which:

y=1 in the case of alkaline earth metal polyaluminates where M can be selected from Ca, Sr, Ba, and from other divalent metals such as Pb and Cd;

y=2 in the case of alkali metal polyaluminates where M can be selected from Li, Na, K, Rb, Cs, and from other monovalent metals such as Ag; and x=4–12.

In this family of compounds two major phase types as well as polytypic intergrowths thereof exist. Thus, when $8 \leq x \leq 12$ a phase with hexagonal symmetry is formed which is known as the β-phase; and when $4 \leq x \leq 6$ a metastable phase with rhombohedral symmetry is formed which is known as the β"-phase. This β"-phase must be stabilized by the addition of monovalent (2–3 mole % added as the oxide) or divalent (8–10 mole % added as the oxide) cations having radii between 60 and 90 pm.

For subsequent description of the present invention, the term β-alumina compounds is meant to comprise all members of the β-alumina family of compounds as defined above, i.e. both β-alumina compounds and β"-alumina compounds, and the term is not restricted to those where M is Na. In this regard it is to be noted that, in the art, sodium β-alumina and sodium β"-alumina, in which M is Na, are often simply referred to as β-alumina or β"-alumina, which is shorthand for sodium β- or β"-alumina, but that this shorthand usage is not used in the present specification. The structural framework of β-alumina compounds is characterised by aluminium-oxygen blocks, known as spinel blocks, separated from one another by so-called conduction planes occupied by bridging oxygen ions and by the M metal ions listed above.

The high mobility at elevated temperatures of the M metal ions in the conduction planes can be exploited in electrochemical sensors and cells. The Applicant is aware of sodium/sulphur and sodium/transition metal (e.g. nickel) chloride electrochemical cells, using sodium β- or sodium β"-alumina ceramic separators, said separators being permeable by and conductive to sodium ions, and functioning as solid electrolytes. In these solid electrolyte separators no electronic conduction is permissible. Metallic constituents are thus discouraged in said separators.

According to the invention there is provided a method of making a β-alumina compound which is a polyaluminate of the general formula:

$$M_yO \cdot xAl_2O_3$$

in which:

M is a metal selected from monovalent metals and divalent metals;

y=2 when M is a monovalent metal;

y=1 when M is a divalent metal; and x=4–12 the method comprising the steps of:

forming a green precursor of the β-alumina compound by mixing together, to form a precursor admixture, particulate aluminium metal and a reagent compound comprising an oxide of the metal M or a precursor thereof;

heating the precursor admixture to a temperature of 800°–1150° C. in an oxidizing environment to cause oxidation of at least part of the aluminium; and heating said admixture comprising the oxidized aluminium to a temperature of 1150°–1350° C. in said oxidizing environment to cause the oxidized aluminium and oxide of the metal M in the admixture to react together to form the β-alumina compound.

As is described further hereunder, forming the green precursor admixture may be so that it comprises one or more particulate reagent compounds capable of providing oxidizing species for oxidizing the aluminium and/or species capable of reacting with aluminum oxide in response to heating to form the β-alumina compound, the heating of the green precursor admixture to a temperature of 200°–700° C. causing production of said species and the subsequent heating of said admixture to 800°–1150° C. causing said species to react with the aluminium to produce aluminium oxide and/or to react with the aluminium oxide to produce the β-alumina compound, the proportions of the aluminium and of the reagent compound in the precursor admixture being selected so that a major proportion of the aluminium may be oxidized by said species in response to the heating to 800°–1150° C. and so that, when said oxidation of the aluminium has taken place, a reaction mixture is obtained having a composition suitable for further heating to cause the constituents thereof to react together to form the β-alumina compound, the reaction mixture finally being heated to 1150°–1350° C. to obtain said β-alumina compound.

Thus, in general, the β-alumina precursor admixture will comprise constituents which, when heated together to 800°–1150° C., provide aluminium oxide together with an oxide of the mobile M metal species and optionally at least one spinel-stabilizer dopant oxide, for stabilizing a spinel structure when such structure is present in the β-alumina product compound.

More particularly, the method may include using, as a said reagent compound, a precursor of the oxide of the metal M, the heating of the admixture being from a starting temperature below 200° C., so that heating the admixture acts to convert the precursor of the oxide of the metal M to the oxide of the metal M at a temperature of 200°–700° C.

The heating to obtain the β-alumina product compound, after the aluminium metal has been oxidized at 800°–1150° C., may, as indicated above, be to a temperature of 1150°–1350° C., preferably about 1250° C.; and the β-alumina product compound may be converted into a sintered unitary polycrystalline ceramic artifact, by further heating to a higher temperature of 1550°– 650° C., preferably about 1620° C.

A particular version of the method thus contemplates that the heating may be to a maximum temperature of 1550°–1650° C. to produce a ceramic β-alumina product.

In principle, the heating steps can be carried out in a single heating cycle, starting with the β-alumina precursor admixture and heating from ambient up to the final temperature at which the ceramic is formed, with such alterations in heating rates and holds or soaks at desired temperatures for appropriate periods, as may be desirable.

By a green precursor admixture of β-alumina is meant an admixture of particulate constituents (aluminium and reagent compounds) which in intimate admixture upon heating will react to form the β-alumina in question. In the course of, or prior to, the reaction to form the β-alumina, some of said constituents may undergo phase changes, such as melting, or chemical changes, such as thermal decomposition. The particulate aluminium metal may be in the form of a powder.

Oxidation of the aluminium may be aided by supplying an additional oxidant, not included in the green precursor admixture, i.e. the oxidant or the oxidants required to oxidise the aluminium need not be supplied entirely by the β-alumina precursor admixture, but may be supplied as external or additional oxidants, in the environment surrounding or adjacent the green precursor admixture.

Thus, additional or external oxidants may be supplied to the reaction environment or atmosphere, e.g. as oxygen gas, water vapour, or other gases reducible by aluminium in the temperature range given above, or they may be supplied from decomposable or volatile solids disposed around or in vicinity of the precursor admixture.

When such artifact or sintered bodies are to be made in accordance with the method of the present invention, the method will typically include a compressing or consolidating step whereby the green precursor admixture is compressed and consolidated into a green artifact or body, prior to the heating to 200°–700° C. to produce the oxidizing species. The artifact or body will then be heated to produce said species, to cause said species to react with the aluminium to produce aluminium oxides, to cause the reaction to form the β-alumina compound, and to cause the conversion to a unitary sintered polycrystalline ceramic artifact or body. The consolidation or compressing may be by uniaxial or isostatic pressing, and may be to a pressure of 25–800 MPa, e.g. 200 MPa.

It follows that a further particular embodiment of the method may include compacting the precursor admixture prior to the heating to consolidate it into a unitary green artifact, so that the heating to 1550°–1650° C. sinters the artifact into a unitary polycrystalline ceramic artifact.

More particularly, the method may include, prior to the heating, mixing an oxidizing constituent into the precursor admixture, the oxidizing constituent being selected to provide oxidizing species in the artifact by the time the artifact is heated to a temperature of 800° C., the oxidizing species contributing, in the interior of the artifact, to said oxidizing environment which causes oxidation of the aluminium. Furthermore, the oxidizing constituent may be selected from precursors of aluminium oxide, precursors of the oxide of the metal M and mixtures thereof which decompose upon heating to 200°–700° C. to release said oxidizing species in the artifact, the heating being from a starting temperature which is below 200° C.

The invention may also comprise the step of forming a porous or partially porous β-alumina ceramic by including, in the admixture, volatile or decomposable oxidant-generating β-alumina precursor components which are selected to leave pores in the ceramic by thermal volatilization or decomposition thereof, to provide oxidants and β-alumina reagent compounds. This aspect does not exclude the manufacture of porous β-alumina ceramics by use of conventional pore formers which, however, are based on combustion of organic compounds and as such require additional oxygen; or are based on a previous pore former decomposition/combustion stage which takes place prior to the heating to 200°–700° C.

The method may thus include mixing a pore former into the precursor admixture prior to the heating, the pore former being selected from volatile or decomposable materials which leave pores in the ceramic artifact when it has been sintered. In particular, the pore former may be an oxidizing constituent selected to provide oxidizing species in the artifact by the time it is heated to a temperature of 800° C.

As indicated above, the method may include heating the precursor mixture in an oxidizing atmosphere which contributes to the oxidizing environment.

Homogeneity and reproducibility of green and sintered bodies are desirable and require a homogeneous and reproducible precursor and admixture, which may be provided for by sufficient milling and, optionally, granulation of the mixture. Thermal treatment required during preparation of the admixture and/or granules may thus be confined to drying of a slurry admixture, if wet milling is chosen for the mixing.

The particulate aluminium may be selected to be a powder having a grain or particle size of 0.5–100 μm, preferably 5–50 μm.

The reagent compounds capable of providing oxidizing species upon heating may be selected from hydroxides, oxyhydroxides, peroxides, nitrates, sulphates, chlorates and mixtures thereof, optionally in conjunction with halides and oxyhalides, in particular chlorides and/or fluorides.

By in conjunction with is meant that halides and oxyhalides can act to facilitate aluminium oxidation by furnace atmospheres or by oxidants in general.

It is expected that, although the method of the present invention can be used to make p-alumina compounds in the form of powders, its principal application will be in the manufacture of β-alumina artifact, such as polycrystalline sintered bodies.

To promote efficient production of the final product, the method may include selecting the constituents and proportions thereof in the admixture so that the metal M is divalent and so that there is an atomic ratio of M:Al in the admixture of 1:8– 1:24; or it may include selecting the constituents and proportions thereof in the admixture so that the metal M is monovalent and so that there is an atomic ratio of M:Al in the admixture of 1:4–1:12.

In a preferred version of the invention, the method may include selecting the proportions of the constituents so that the value of x is 8–12, the method including mixing a spinel-stabilizer dopant into the precursor admixture, the dopant being selected from monovalent metal oxides or precursors thereof forming (as the oxide) 2–3 mole % of the β-alumina product and from divalent metal oxides or precursors thereof forming (as the oxide) 8–10 mole % of the β-alumina product, to form a product having a stabilized rhombohedral phase.

The invention extends to a β-alumina compound, whenever produced by the method described above.

According to another aspect of the invention there is provided a green precursor admixture for use in making a β-alumina compound, the admixture comprising particulate aluminium metal and a reagent compound comprising an oxide of a metal M or a precursor thereof, the metal M being selected from monovalent metals and divalent metals.

More particularly, the green precursor admixture may comprise particulate aluminium metal intimately admixed with reagent compounds, which reagent compounds are capable, upon heating to 200°–700° C., of providing oxidizing species for oxidizing the aluminium and/or which are capable of reacting with aluminium oxide in response to heating to form the desired β-alumina compound, the proportions of the aluminium and of the reagent compounds in the precursor admixture being selected so that a major proportion (at least 50%) of the aluminium is oxidizable by said species in response to heating the admixture to 800°–1150° C., and so that the admixture, upon heating to 800°–1150° C., yields the stoichiometric oxide composition required to form the desired β-alumina compound.

More specifically, the green precursor admixture may be as described above with reference to the method, and, in particular, it may be in the form of a consolidated green body or artifact, having a desired shape, which can be formed into a unitary polycrystalline sintered product by suitable heating.

The invention will now be described in more detail, with reference to the following non-limiting examples:

EXAMPLE 1

Sodium β''-Alumina Ceramic Stabilized with Lithium

The β''-alumina ceramic described in this example has the composition

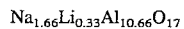
$Na_{1.66}Li_{0.33}Al_{10.66}O_{17}$

A stoichiometric reaction mixture containing the following constituents is dry mixed for 30 minutes in a Turbula mixer, Type T2C, made by Helmut Clauss, Liebigstrasse, PO Box 23, 6113 Nidderau, Germany:

| Constituents | Parts by Mass |
| --- | --- |
| Al metal powder | 11.99g |
| AlOOH (hydrothermally prepared boehmite) | 8.89g |
| NaAlO$_2$ | 10.00g |
| LiAlO$_2$ | 1.15g |

40 ml of an isopropanol organic solvent (n-pentanol can be used instead) is added to the dry reaction mixture, and the resulting slurry is then wet milled in an attritor mill with zirconia milling media for approximately one hour, or at least until the average particle size in the slurry is below 10 μm.

The resulting slurry is dried in a rotary vacuum dryer at about 40° C. to produce a powder granulate consisting of finely intermeshed metal and ceramic powder. The solvent can be recovered, and re-used in the milling step.

The powder granulate is uniaxially pressed (500 MPa) to form a high density green body. During the uniaxial pressing, the voids between the rigid inorganic powder reactants are filled by plastic flow of the aluminium particles resulting in a strong green body consisting of an intermeshed metal/metal-oxide(oxyhydroxide) composite.

This composite green body is sintered with the following sintering programme: 600 K/h from room temperature to 1620° C., hold at this temperature for 15 minutes and cool at 600 K/h to room temperature.

The resulting ceramic artifact is found to be a single phase, sodium β''-alumina ceramic with a density exceeding 3.18 g/cm³.

EXAMPLE 2

Sodium β''-Al$_2$O$_3$ Ceramic Stabilised with Mg-Ions

The β''-Al$_2$O$_3$ ceramic described in this example has the composition

$Na_{1.66}Mg_{0.66}Al_{10.33}O_{17}$.

A stoichiometric reaction mixture containing the following constituents is dry mixed for 30 minutes in a Turbula Mixer:

| Constituents | Parts by Mass |
| --- | --- |
| Al metal powder | 11.99g |
| AlOOH (hydrothermally prepared boehmite) | 8.89g |
| NaAlO$_2$ | 10.00g |
| MgAl$_2$O$_4$ | 6.94g |

40 ml of isopropanol organic solvent (or n-pentanol) is added to the dry reaction mixture, and the resulting slurry is then milled in an attritor mill with zirconia milling media for about one hour or at least until the average particle size of the slurry is below 10 μm.

The resulting slurry is dried in a rotary vacuum dryer at 40°–50° C. to produce a powder granulate consisting of finely intermeshed metal and ceramic powder. The solvent can be recovered and reused in the milling step.

The powder granulate is uniaxially pressed at 200 Mpa to a high density green body. During the uniaxial pressing, the voids between the rigid inorganic powder reactants are filled by plastic flow of the aluminium particles resulting in a strong green body consisting of an intermeshed metal/metal oxide (oxyhydroxide) composite.

This composite green body is sintered with the following sintering programme: 600 K/h from room temperature to 1620° C., hold at this temperature for 15 minutes and cool at 600 K/h to room temperature.

The resulting ceramic artifact is found to be a single-phase, sodium β''-alumina ceramic with a density exceeding 3.18 g/cm³.

EXAMPLE 3

Potassium β''-Al$_2$O$_3$ Ceramic Stabilized with Mg-Ions

The β''-Al$_2$O$_3$ ceramic described in this example has the composition

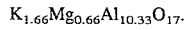
$K_{1.66}Mg_{0.66}Al_{10.33}O_{17}$.

A stoichiometric reaction mixture containing the following constituents is dry mixed for 30 minutes in a Turbula Mixer:

| Constituents | Parts by Mass |
| --- | --- |
| Al (metal) | 10.49g |
| AlOOH (hydrothermally prepared Boehmite) | 8.89g |
| KAlO$_2$ | 11.95g |
| MgAl$_2$O$_4$ | 6.94g |

40ml of isopropanol organic solvent (or n-pentanol) is added to the dry reaction mixture and the resulting slurry is then milled in an attritor-mill with zirconia milling media for about 1 hour or at least until the average particle size of the slurry is below 10 pm.

The resulting slurry is dried in a rotary vacuum dryer at 40° C. to produce a powder granulate consisting of finely intermeshed metal and ceramic powder. The solvent can be recovered and reused in the milling step.

The powder granulate is uniaxially pressed (450 MPa) to a high density green body. During the uniaxial pressing,the voids between the rigid inorganic powder reactants are filled by plastic flow of the aluminium particles resulting in a strong green body consisting of an intermeshed metal/metal-oxide (oxy-hydroxide) composite.

This composite green body is sintered with the following sintering programme: 600 K/h from room temperature to 1620° C., hold at this temperature for 15 minutes and cool at 600 K/h to room temperature.

The resulting ceramic artifact is found to be a single-phase, potassium β"-alumina ceramic.

EXAMPLE 4

Sodium β-Al$_2$O$_3$ Ceramic

The β-Al$_2$O$_3$ ceramic described in this example has the composition $$Na_{1.67}Al_{11}O_{17.33}.$$

A stoichiometric reaction mixture containing the following components is dry mixed for 30 minutes in a Turbula Mixer:

| Constituents | Parts by Mass |
| --- | --- |
| Al (metal) | 14.43g |
| AlOOH (hydrothermally prepared boehmite) | 8.89g |
| NaAlO$_2$ | 10.00g |

40 ml of isopropanol organic solvent (or n-pentanol) is added to the dry reaction mixture and the resulting slurry is then milled in an attritor mill with zirconia milling media for about 1 hour or at least until the average particle size of the slurry is below 10 μm.

The resulting slurry is dried in a rotary vacuum dryer at 55° C. to produce a powder granulate consisting of finely intermeshed metal and ceramic powder. The solvent can be recovered and reused in the milling step.

The powder granulate is uniaxially pressed (200 Mpa) to a high density green body. During the uniaxial pressing, the voids between the rigid inorganic powder reactants are filled by plastic flow of the aluminium particles resulting in a strong green body consisting of an intermeshed metal/metal-oxide (oxy-hydroxide) composite.

This composite green body is sintered with the following sintering programme: 600 K/h from room temperature to 1620° C., hold at this temperature for 15 minutes and cool at 600 K/h to room temperature.

The resulting ceramic artefact is found to be a single phase sodium β-Al$_2$O$_3$ ceramic with a density exceeding 3.15 g/cm$^3$.

The Applicant has in the past prepared β-alumina solid electrolyte ceramics by reacting the oxides of the aluminium and the metal M, or their precursors, together at elevated temperatures. The reaction product is then wet milled, dried, pressed to a green body, and sintered to produce a polycrystalline ceramic artifact.

The general features of this aluminium oxide processing route are the intensive high temperature reaction schedules, low density, fragile intermediate green bodies and relatively high shrinkages, and associated deformation upon sintering.

The present invention, in contrast, provides a method for producing high density, high strength β-alumina ceramic artifact, which, at least as described with reference to the above Examples, are homogeneous on a microstructural scale.

The invention as described in the Examples at least, also provides μ-alumina precursors as firm, machinable green bodies, capable of sintering to dense ceramic artifacts with controllable shrinkage (5–15% linear shrinkage), with minimal deformation, in a single firing step.

The invention provides, moreover, the capability in principle of rapid firing of said green bodies, and therewith increased sintering furnace throughput.

The Applicant has formed β-alumina from other precursors in the past, but this has generally necessitated a stepwise synthesis consisting of a series of thermal treatments leading to a stepwise densification of the reaction mixture. By including aluminium metal in the precursor mix according to the present invention, and oxidizing said aluminium internally, ie by using a decomposition product of another component of the precursor mix to take said aluminium into β-alumina compound formation, the overall volume change and deformation can however be reduced, and a single-step synthesis from the green body is made possible, yielding ceramics of the β-phase or the β"-phase, as desired.

Particularly valuable mechanical properties can in principle be conferred on the green body by the aluminium metal content of the precursor admixture. Plastic flow of the metal particles can allow uniaxial pressing to achieve high density and strength of an intermeshed oxyhydroxide/metal composite. This composite not only promotes a high green strength but can promote an intimate, continuous reaction surface for the initial internal oxidation as well as for the subsequent reaction to the final β-alumina phase.

The present invention is directed to yield a non-fused, sintered product, and the oxidizing means is supplied at least partly by chemical reduction of green compact constituents, preferably a homogeneous, one-phase β-alumina artifact.

Furthermore, the present invention provides a useful way to arrive at a functional ceramic product which is an ionic conductor, whereby all the metallic constituents thereof must be fully oxidized and subsequently converted to the product.

We claim:

1. A method of making a β-alumina compound which is a polyaluminate of the general formula:

$$M_yO \cdot xAl_2O_3$$

in which:

M is a metal selected from monovalent metals and divalent metals;

y=2 when M is a monovalent metal;

y=1 when M is a divalent metal; and x=4–12, the method comprising the steps of:

forming a green precursor of the β-alumina compound by mixing together, to form a precursor admixture, particulate aluminum metal, a pore former selected from volatile materials and decomposable materials, and a reagent compound, wherein the reagent compound is a metal oxide comprising the metal M or is a precursor of the metal oxide;

heating the precursor admixture a temperature of 800°–1150° C. in an oxidizing environment to cause oxidation of at least part of the aluminum and to ensure that the reagent compound is in metal oxide form;

heating said admixture comprising the oxidized aluminum to a temperature of 1150°–1350° C. in said oxidizing enviromnent to cause the oxidized aluminum and the oxide comprising the metal M in the admixture to react together to form the β-alumina compound;

compacting the β-alumina compound into a unitary green artifact; and heating the green artifact to 1550°–1650° C. to produce a sintered polycrystalline ceramic artifact.

2. A method as claimed in claim 1, in which said reagent compound is a precursor of the oxide comprising the metal M, wherein the precursor converts to the oxide comprising the metal M in the temperature range of 200°–700° C. and the heating to 800°–1500° C. is started at a temperature below 200° C.

3. A method as claimed in claim 1, in which an oxidizing constituent is mixed into the precursor admixture before the heating, the oxidizing constituent decomposing at a temperature below 800° C.

4. A method as claimed in claim 3, in which the oxidizing constituent is selected from precursors of aluminum oxide, precursors of the oxide comprising the metal M and mixtures thereof, the oxidizing constituent decomposing in the temperature range of 200°–700° C., the heating to 800°–1150° C. being started at a temperature below 200° C.

5. A method as claimed in claim 1, in which the pore former is an oxidizing constituent which decomposes at a temperature below 800° C.

6. A method as claimed in claim 1, which includes heating the precursor admixture in an oxidizing atmosphere.

7. A method as claimed in claim 1, which includes selecting the constituents and proportions thereof in the admixture so that the metal M is divalent and so that there is an atomic ratio of M:Al in the admixture of 1:8–1:24.

8. A method as claimed in claim 1, which includes selecting the constituents and proportions thereof in the admixture so that the metal M is monovalent and so that there is an atomic ratio of M:Al in the admixture of 1:4–1:12.

9. A method as claimed in claim 1, which includes selecting the proportions of the constituents so that the value of x is 8–12, the method including mixing a spinel-stabilizer dopant into the precursor admixture, the dopant being selected from monovalent metal oxides or precursors thereof forming (as the oxide) 2–3 mole % of the β-alumina product and from divalent metal oxides or precursors thereof forming (as the oxide) 8–10 mole % of the β-alumina product, to form a product having a stabilized rhombohedral phase.

10. A method as claimed in claim 2, in which the reagent compound is the pore former.

11. A method as claimed in claim 1, in which the reagent compound is a metal oxide.

12. A method of making a β-alumina compound which is a polyaluminate of the general formula:

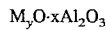

in which:

M is a metal selected from monovalent metals and divalent metals:

y=2 when M is a monovalent metal;

y=1 when M is a divalent metal; and x=4–12, the method comprising the steps of:

forming a green precursor of the β-alumina compound by mixing together, to form a precursor admixture, particulate aluminum metal and a reagent compound which is a metal oxide comprising the metal M, and an oxidizing constituent;

heating the precursor admixture a temperature of 800°–1150° C. in an oxidizing enviromnent to cause oxidation of at least part of the aluminum; and heating said admixture comprising the oxidized aluminum to a temperature of 1150°–1350° C. in said oxidizing enviromnent to cause the oxidized aluminum and the oxide comprising the metal M in the admixture to react together to form the β-alumina compound, wherein the oxidizing constituent decomposes at a temperature below 800° C.

13. A method as claimed in claim 12, in which the β-alumina compound is further heated to 1550°–1650° C. to produce a ceramic β-alumina product.

14. A method as claimed in claim 13, which includes compacting the precursor admixture prior to the heating into a unitary green artifact.

15. A method as claimed in claim 14, in which the oxidizing constituent is selected from precursors of aluminum oxide, precursors of the oxide comprising the metal M and mixtures thereof, the oxidizing constituent decomposing at a temperature of 200°–700° C., and wherein heating to 800°–1150° C. is at a starting temperature below 200° C.

16. A method as claimed in claim 13, includes mixing a pore former with the precursor admixture prior to the heating, the pore former being selected from volatile and decomposable materials.

17. A method as claimed in claim 16, in which the pore former is an oxidizing constituent which decomposes at a temperature below 800° C.

18. A method as claimed in claim 17, which includes heating the precursor admixture in an oxidizing atmosphere.

19. A method as claimed in claim 12, in which the metal M is divalent and there is an atomic ratio of M:Al in the admixture of 1:8–1:24.

20. A method as claimed in claim 12, in which the metal M is monovalent and there is an atomic ratio of M:Al in the admixture of 1:4–1:12.

21. A method as claimed in claim 12, which includes selecting the proportions of the constituents so that the value of x is 8–12, the method including mixing a spinel-stabilizer dopant in the precursor admixture, the dopant being selected from monovalent metal oxides or precursors thereof forming (as the oxide) 2–3 mole % of the β-alumina product and from divalent metal oxides or precursors thereof forming (as the oxide) 8–10 mole % of the β-alumina product to form a product having a stabilized rhombohedral phase.

* * * * *

UNITED STATES PATENT AND TRADEMARK OFFICE
CERTIFICATE OF CORRECTION

PATENT NO.    :   5,518,975

DATED         :   May 21, 1996

INVENTOR(S)   :   Van Zyl et al.

It is certified that error appears in the above-identified patent and that said Letters Patent is hereby corrected as shown below:

On the title page:

In the Abstract, item [57], line 6, please delete "62-alumina" and insert --ß-alumina-- therefor.

Signed and Sealed this

Twenty-fourth Day of September, 1996

Attest:

BRUCE LEHMAN

Attesting Officer

Commissioner of Patents and Trademarks